(12) United States Patent
Tomari et al.

(10) Patent No.: US 7,601,295 B2
(45) Date of Patent: Oct. 13, 2009

(54) FILTER, LIQUID DISCHARGE HEAD UTILIZING THE SAME, AND PRODUCING METHOD THEREFOR

(75) Inventors: Yoshiaki Tomari, Yokohama (JP); Katsunori Heishi, Fukushima (JP); Setsuo Fukuda, Ushiku (JP)

(73) Assignee: Canon Kabushiki Kaisha, Tokyo (JP)

( * ) Notice: Subject to any disclaimer, the term of this patent is extended or adjusted under 35 U.S.C. 154(b) by 434 days.

(21) Appl. No.: 11/275,587

(22) Filed: Jan. 17, 2006

(65) Prior Publication Data
US 2006/0157541 A1 Jul. 20, 2006

(30) Foreign Application Priority Data
Jan. 20, 2005 (JP) .............................. 2005-012758

(51) Int. Cl.
*B22F 3/11* (2006.01)
(52) U.S. Cl. ........................... 419/2; 228/190; 228/193; 228/199; 228/201; 228/202; 428/292.1; 428/304.4

(58) Field of Classification Search ...................... 419/2
See application file for complete search history.

(56) References Cited

U.S. PATENT DOCUMENTS

| 4,493,756 | A | * | 1/1985 | Degen et al. ................. 205/712 |
| 6,354,688 | B1 | | 3/2002 | Inoue et al. |

FOREIGN PATENT DOCUMENTS

| JP | 6-200456 | | 7/1994 |
| JP | 06200456 A | * | 7/1994 |
| JP | 2001-253083 | | 9/2001 |
| JP | 2001253083 A | * | 9/2001 |

* cited by examiner

*Primary Examiner*—Roy King
*Assistant Examiner*—Christopher S Kessler
(74) *Attorney, Agent, or Firm*—Fitzpatrick, Cella, Harper & Scinto

(57) ABSTRACT

A filter is formed by a sintered non-woven metal fiber cloth adapted to be installed in a liquid passage, and, in the filter, a substance sticking to the surface of metal fibers which is present in the outermost part of the filter and in the vicinity thereof is removed together with the surface layer of the metal fibers.

13 Claims, 7 Drawing Sheets

FILTER, LIQUID DISCHARGE HEAD UTILIZING THE SAME, AND PRODUCING METHOD THEREFOR

BACKGROUND OF THE INVENTION

1. Field of the Invention

The present invention relates to a filter to be installed in a liquid flow path, a liquid discharge head utilizing such filter, and a producing method therefor.

2. Related Background Art

With the recent advancement in the scientific technologies and image drawing technologies, demand is increasing for a precise filtration of chemical solutions. Particularly in an ink jet printer for forming an image by discharging an ink onto a recording medium, a finer ink droplet is considered essential for attaining a required finer definition in the image. In the recent commercial ink jet printers, the mounted ink jet head generally has a nozzle diameter of 30 μm or less regardless of the ink discharging mechanism, and such nozzle diameter is anticipated to continue to become finer for meeting the requirement for a finer definition in the image. In case of a precise ink discharge from such small nozzle, a foreign matter eventually present in the ink may cause a fluctuation in the volume of the flying ink droplet, thereby deteriorating the precision of image drawing. Also such foreign matter, if deposited around the discharge port, will cause a continuous influence on the precision of discharge. For the purpose of avoiding such phenomenon, a filter for precise filtration is provided in an ink passage in the proximity of the recording head.

A filter used for such purpose has been made by a mesh woven with resinous fibers or metal fibers, or a thin metal plate having apertures formed by a pattern etching or a pattern plating. Also a filter apparatus, utilizing an electrolytic polishing to such metal filter to remove scratches or irregularities on the aperture-containing surface and oxides sticking to the surface thereby preventing agglomeration of the pigment of the ink on such surface, is disclosed for example in Japanese Patent Application Laid-open No. 2001-253083. In such ink jet printer utilizing a pigment, since the image recording is executed by a pigment deposition onto a recording medium, a discharge nozzle has a diameter as large as about 30 μm in comparison with an ink-jet printer utilizing an organic dye. Therefore the former may utilize a coarser filter in comparison with the latter, but it involves a restriction that a filter having fine apertures not passable by the pigment particles cannot be used.

On the other hand, the ink jet printer utilizing a dye as colorant is not associated with the aforementioned restriction for pigment and can utilize a filter with a very small aperture size, such as a sintered non-woven cloth of metal fibers, in order to improve the precision of filtration. It is thus rendered possible to reduce the discharge nozzle to a diameter of about 15 mm for improving the precision of ink discharge and thus improving the image quality. Such sintered non-woven metal fiber cloth for precision filtration is formed by sintering web-shaped stainless steel fibers in a vacuum oven and surface flattening under a press, and is employed in an ink jet printer requiring a high-quality image recording. Also for attaining a filtration of a high precision, there is employed also a filter formed by sandwiching a web-shaped sheet with an average wire diameter of about 5 mm between web-shaped sheets with an average wire diameter of about 15 mm and, after a sintering in a vacuum oven, flattening the surface under a press.

However, in such sintered non-woven metal fiber cloth, as described in Japanese Patent Application Laid-open No. H6-200456, foreign substances of a particle size of about 10 μm, resulting from a sintering spacer used at the sintering operation, may be deposited on the surface of the sintered non-woven metal fiber cloth. Also in the pressing operation executed for surface flattening after the sintering of the metal fiber web, a contaminant may be pressed into the surface of the sintered non-woven metal fiber cloth or may cause a defect or a distortion in the metal fibers.

Also in case of using a sintered non-woven metal fiber cloth with such deposits as a filter, the deposit liberated from the filter may clog the flow path or may be deposited around the port of the discharge nozzle in a recording head with a smaller diameter, and such phenomena result in a loss in the image quality.

Such problems are not limited to the filter installed in the ink jet apparatus as explained above, but are also present in biotechnology- or scientific technology-related apparatuses, in which even a very slight contamination must be prevented and thus require an ultra fine filtration.

SUMMARY OF THE INVENTION

An object of the present invention is to provide a filter formed by a sintered non-woven metal fiber cloth capable of avoiding drawbacks resulting from the filter itself, and a liquid discharge head utilizing such filter.

Another object of the present invention is to provided filter formed by a sintered non-woven metal fiber cloth, to be installed in a liquid flow path, in which an outermost part of the filter and a substance deposited on a surface of metal fibers present in the proximity of the outermost part are removed together with a surface layer of the metal fibers.

DETAILED DESCRIPTION OF THE PREFERRED EMBODIMENTS

In the following, embodiments of the present invention will be explained with reference to the accompanying drawings.

Figure 1:
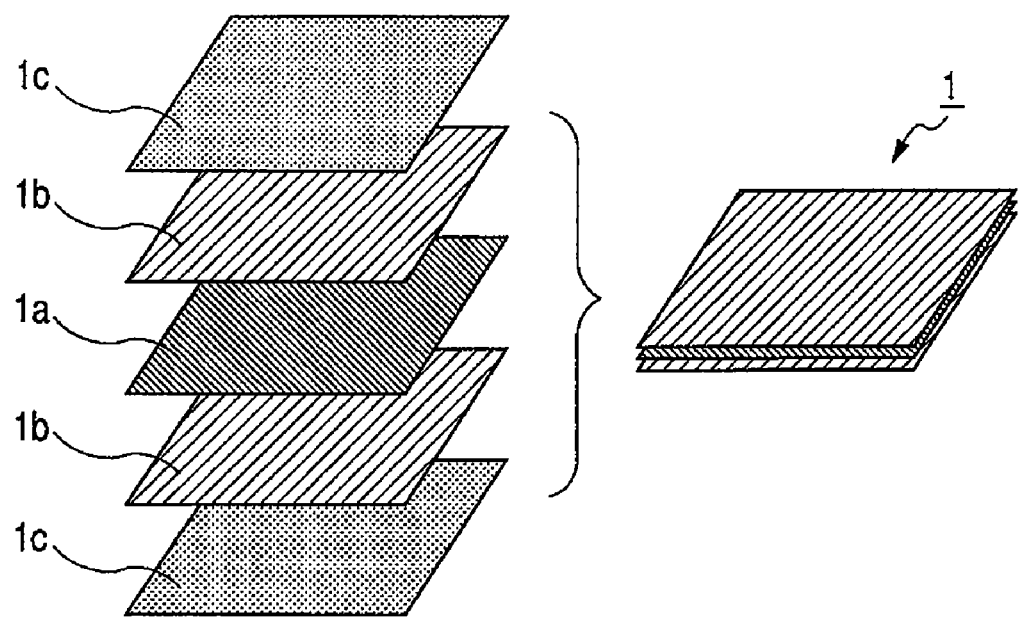
FIG. 1 is a schematic view showing a configuration of a sintered sheet of a non-woven metal fiber cloth, constituting an example of the present invention.

FIG. 1 is a schematic view showing a representative producing method for a sintered non-woven metal fiber cloth 1. At first, a metal fiber web sheet 1a of a small average wire diameter is sandwiched between metal fiber web sheets 1b of a larger average wire diameter, and further sandwiched between releasing sheets 1c. Such assembly is superposed in plural layers, which are pressed under heating in vacuum to cause an atomic diffusion bonding of the metals in a contact point between the fibers. Then the releasing sheet 1c is peeled off, and the sintered metal fiber sheet is subjected to a rolling to flatten the surface, thereby obtaining the sintered sheet 1 of the non-woven metal fiber cloth.

However, in the above-mentioned sintering process, the substance constituting the releasing layer may be separated from the releasing sheet 1 and deposed or fused to the surface of metal fibers in the vicinity of the external layer of the sintered sheet 1 of the non-woven metal fiber cloth, or a foreign substance may be pressed and deposited thereon in the succeeding rolling process.

Figure 2:
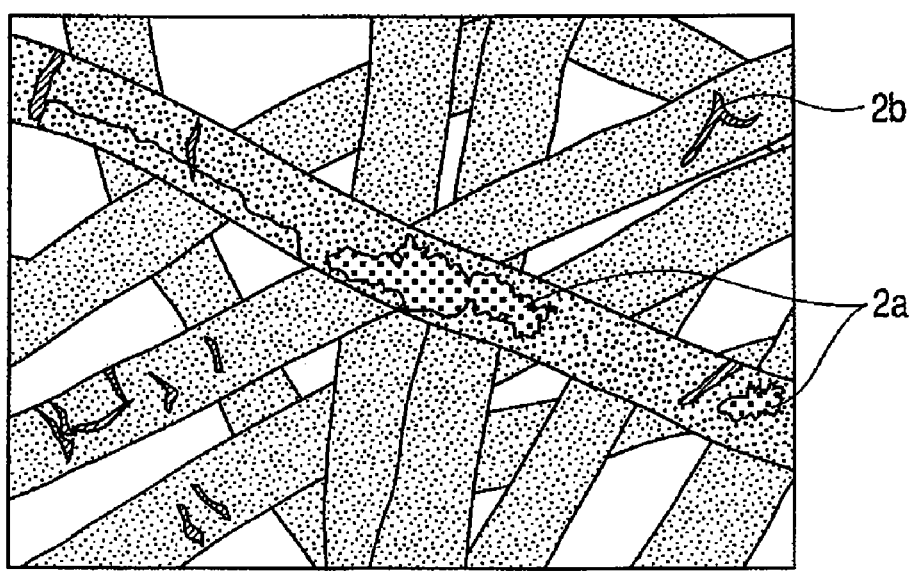
FIG. 2 is a schematic view representing a SEM image of a sintered sheet of a non-woven metal fiber cloth after peeling off a releasing sheet.

FIG. 2 is a schematic view representing a scanning electron microscope (SEM) image of the surface of the stainless steel fibers in the vicinity of the external surface, when the sintered non-woven metal fiber cloth 1 is prepared by the process shown in FIG. 1. The sample is prepared from a web sheet 1a formed by austenite stainless steel fibers of an average diameter of 4 μm, a web sheet 1b formed by austenite stainless steel fibers of an average diameter of 12 μm, and a releasing sheet 1c having a releasing layer of titanium oxide. In the microscopic observation, the web sheet 1a of austenite stainless steel fibers of an average diameter of 4 μm was shielded by the web sheet 1b of austenite stainless steel fibers of an average diameter of 12 μm and could not be observed from the exterior.

In FIG. 2, 2a indicates titanium oxide peeled off from the releasing layer of the releasing sheet 1c, and sticks, in an assembly of fragments of 5 μm or less, on the surface of stainless steel fibers of the web sheet 1b, present in the vicinity of the external layer of the sintered non-woven sheet 1.

Also 2b indicates a crystal boundary or a defect in the vicinity of the surface of the stainless steel fiber, generated in the process of preparing a stainless steel fiber web or a process of preparing the sintered non-woven stainless steel cloth, and observed particularly in parts where the metal fibers are mutually overlaid.

A removal of titanium oxide, sticking to the surface of the stainless steel fiber, by dissolution with a chemical, may possibly result in an over-etching of the stainless steel fiber surface because of the high chemical resistance of titanium oxide. Particularly an excessive etching in a jointing part of the stainless steel fibers or a thinner part of the stainless steel fiber will deteriorate the strength and the function of the filter. In order to prevent such phenomenon, it is desirable to employ, instead of directly etching titanium oxide, a process of gradually dissolving the stainless steel adhering to titanium oxide, thereby releasing the deposited titanium oxide from the stainless steel fiber.

For realizing such removing process, there is advantageously employed an electrolytic polishing of executing an electrolysis using the sintered non-woven stainless steel sheet while it is in contact with an aqueous electrolyte solution. In an electrolytic polishing, the surface of the stainless steel fibers near the outermost layer of the sheet is opposed to the counter electrode and is normally etched, but a pointed portion of the stainless steel fibers is shadowed and shows a lower current density, whereby the etching rate becomes lower. For a similar reason, fine wires as in the web sheet 1a, sandwiched in the interior of the sheet, are scarcely etched, thereby reducing the danger of the deterioration in strength and function of the filter by the excessive etching of the joint portion or smaller diameter portion of the stainless steel fibers.

Figure 3:
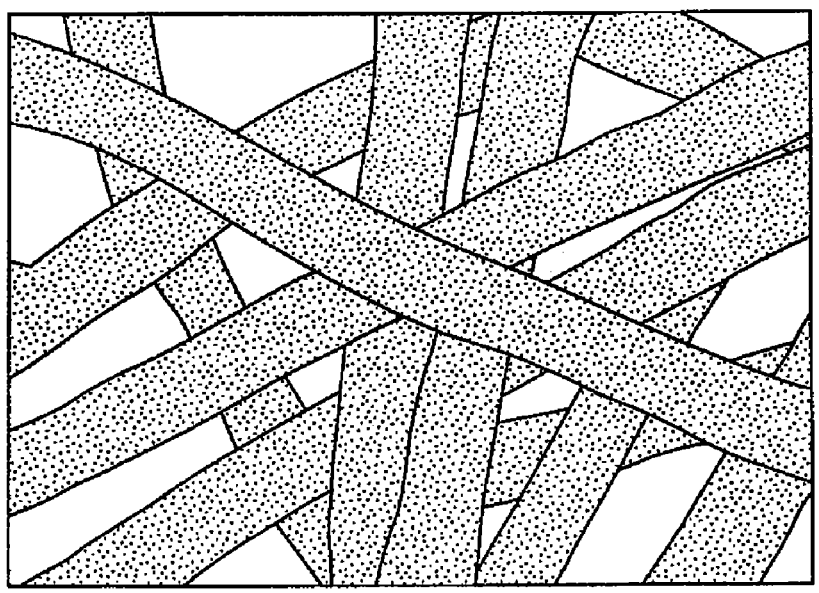
FIG. 3 is a schematic view representing a SEM image of a sintered sheet of a non-woven metal fiber cloth after an electrolytic polishing.

FIG. 3 is a schematic view representing a SEM-observation of the surface of the stainless steel fibers after the electrolytic polishing with the sintered sheet of a non-woven metal fiber cloth formed by austenite stainless steel as the anode, and it is observed that the deposits, crystal boundaries and defects are removed.

Figure 4:
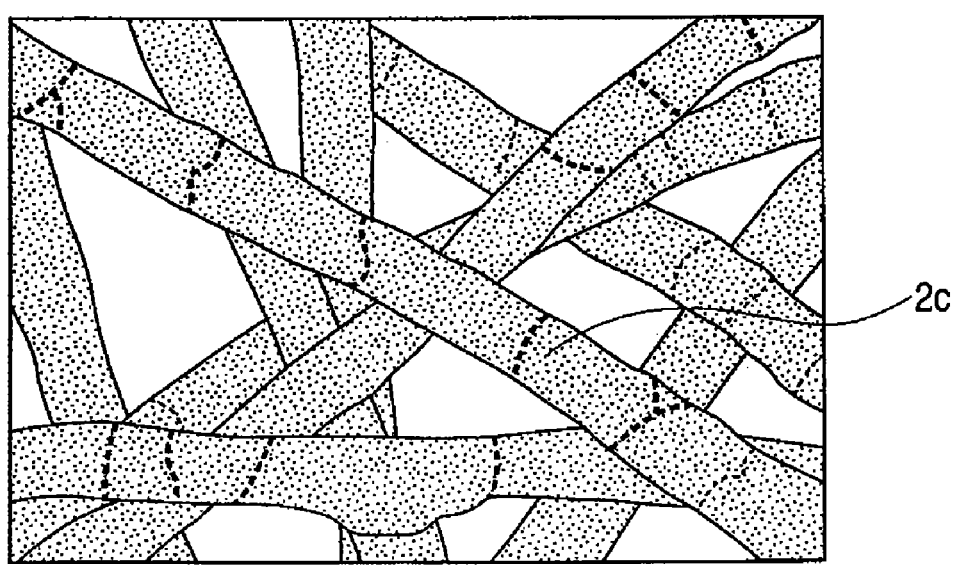
FIG. 4 is a schematic view representing a SEM image of a sintered sheet of a non-woven metal fiber cloth after an electrolytic polishing.

Depending on the bath composition and the conditions of electrolytic polishing, the positions of the crystal boundary and the defects may be emphasized and rendered easily observable as indicated by 2c in FIG. 4. Such phenomenon takes place when the crystal boundary or the defect on the metal fiber surface, generated in the process of preparing the sintered non-woven metal fiber cloth, is preferentially etched in the electrolytic polishing. However, such phenomenon is permissible in the practical use, as long as the strength and function of the filter are not deteriorated.

As a bath for electrolytic polishing, an alkaline or acidic aqueous electrolyte solution can be employed advantageously. An aqueous electrolyte solution can be an acidic aqueous solution containing phosphoric acid as a principal component and added with a small amount of sulfuric acid and other components, and an alkaline aqueous solution containing potassium hydroxide as a principal component and added with a small amount of an organic acid and other components. These solutions may be employed advantageously depending on the situation.

Also in case the metal fibers are constituted of stainless steel, it is possible, after the electrolytic polishing, to contact the surface of stainless steel with an aqueous solution of nitric acid to form an oxide film, thereby protecting the stainless steel from a chemical liquid to be filtered or preventing the components of stainless steel from dissolving into the chemical liquid. The aqueous solution of nitric acid to be employed preferably has a concentration of 30-40%, and it is preferable to execute an immersion for 30 minutes or more at a bath temperature equal to or higher than the room temperature.

FIGS. 5-8 are schematic views showing examples of a filter 6 of the sintered non-woven metal fiber cloth, prepared as described above, incorporated in an apparatus. The filter 6 can be obtained in the following manner, from the sintered non-woven cloth sheet 1 as shown in FIG. 1, which is prepared as shown in FIG. 1 from a web sheet 1b of stainless steel fibers of an average diameter of 12 mm and a web sheet 1a of stainless steel fibers of an average diameter of 4 mm, both formed of SUS316L. The sheet 1 is cut into slats of a predetermined size, subjected to an electrolytic polishing in the above-explained process, and, after rinsing with water, immersed in an aqueous solution nitric acid to form an oxide film on the surface of stainless steel fibers. Then it is further rinsed with water and dried, and is finally cut into a size for mounting as a filter in a product, thereby completing the filter 6.

Figure 5:
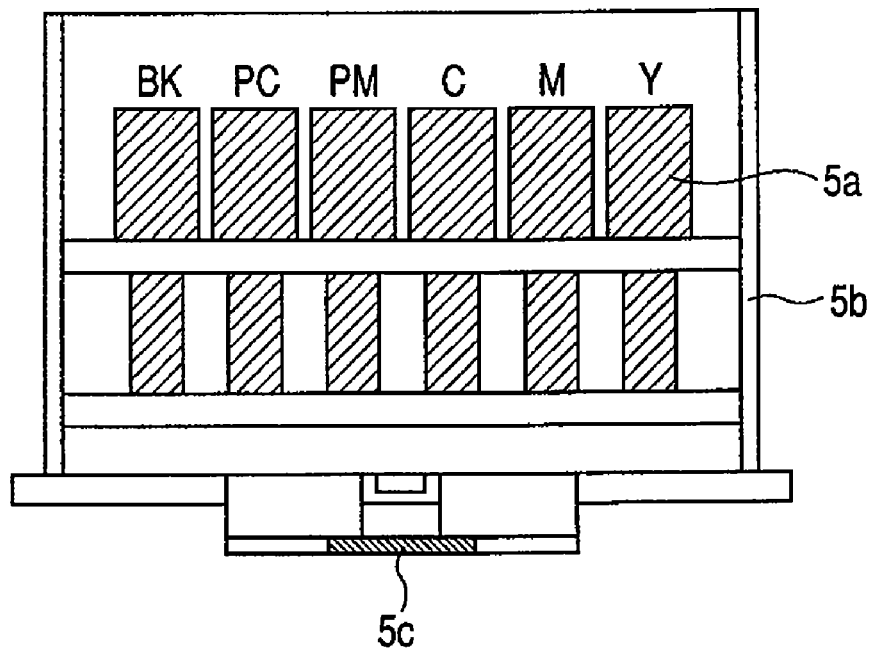
FIG. 5 is a schematic view of a recording head.

FIG. 5 is a schematic view showing a recording head module 5b including a recording head 5c, in which an ink tank 5a is mounted.

Figure 6:
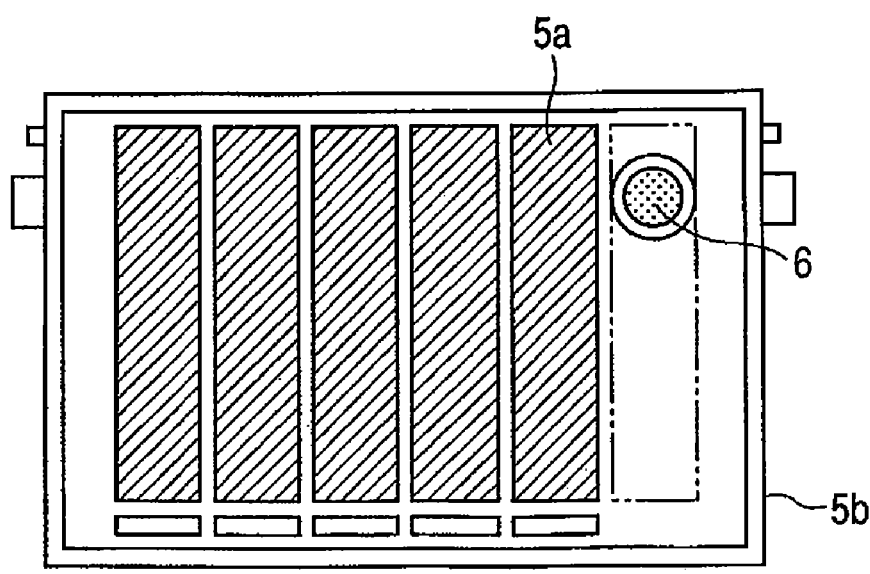
FIG. 6 is a schematic view of a recording head module.

FIG. 6 is a schematic view, seen from above, of the recording head module 5b from which a yellow ink tank is detached, showing a filter 6 mounted in a jointing part between the ink tank 5a and the recording head module 5b.

Figure 7:
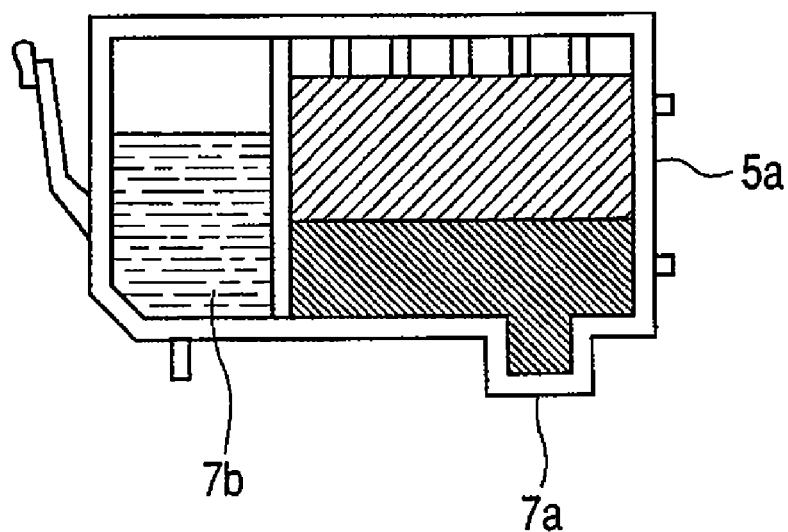
FIG. 7 is a schematic view of an ink tank.

FIG. 7 is a schematic lateral view of the ink tank 5a. The ink tank 5a has a structure in which a pressure contact part 7a at an end is to be connected to the filter 6 mounted on the recording head module 5b whereby an ink 7b is supplied through an ink supply passage to the recording head 5c.

Figure 8:
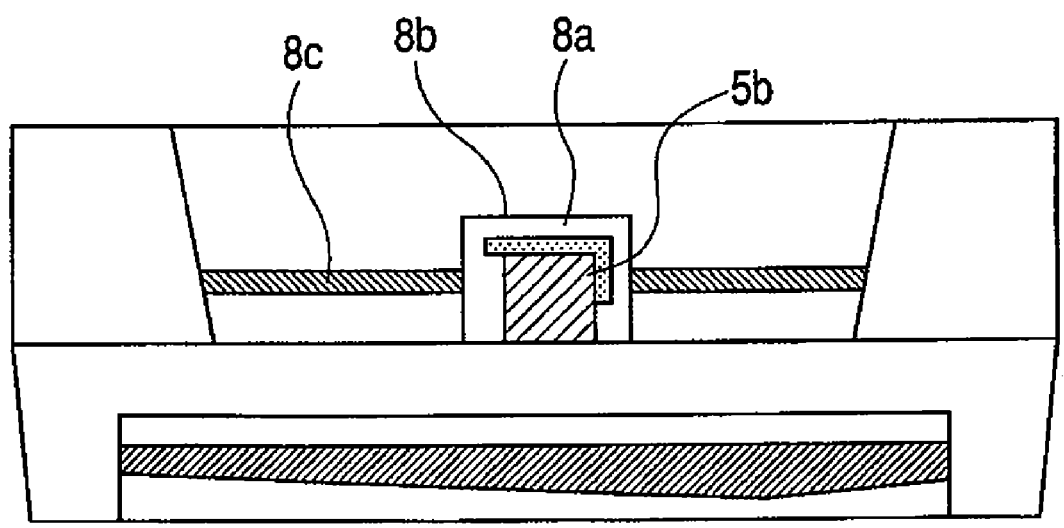
FIG. 8 is a schematic view of an ink jet printer.

FIG. 8 is a schematic view of an ink jet printer, in which a recording head module 5b, having an ink tank 5a, is mounted, by a head fixing mechanism 8a, on a carriage 8b rendered movable along a guide shaft 8c. Though not illustrated, the filters 6 are provided individually on the recording head module 5b, respectively corresponding to the six mounted ink tanks.

The ink jet recording apparatus thus prepared was free, because of the elimination of the titanium-based contamination derived from the filters 6, from an image distortion or a liquid ink discharge failure at the recording operation. Also in a durability test of the apparatus, there were confirmed a reduction in the bubble involvement into the ink flow path caused by detach/attaching operation of the ink tanks, and a reduction in the ink discharge failure caused by a bubble riding on the ink heating heater. As a result, a service life to a heater destruction increased in an accelerated test. Also a gas-liquid exchange at the detach/attaching operation of the ink tanks was achieved smoothly to achieve an improved efficiency in the use of ink.

Also, in detaching the ink tank 5a from the recording head module 5b, a frictional property between the pressure contact member 7a of the ink tank 5a and the surface of the filter 6 is improved, whereby the ink tank 5 could be detached or attached more easily.

The foregoing description explains the features of the present invention merely by an ink jet recording apparatus as an example, and the filter of the present invention is not restricted to such apparatus for mounting but can be employed arbitrarily to any apparatus to be protected from contamination requiring a precise filtration.

Also in the filter of the present invention, a wire diameter can be arbitrarily selected according to the purpose of use.

EXAMPLE 1

An electrolytic polishing process for the sintered sheet 1 of non-woven metal fiber cloth will be explained in the following.

Figure 9:
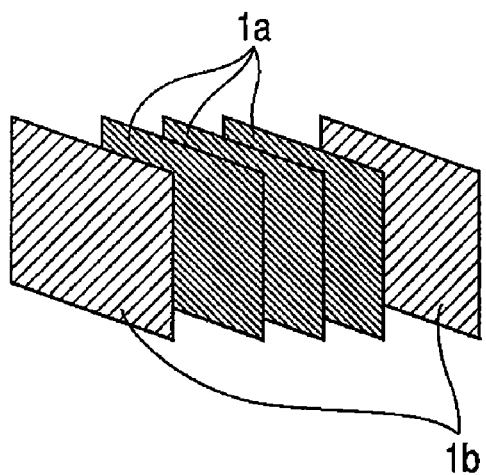
FIG. 9 is a schematic view showing a configuration of a sintered sheet of a non-woven metal fiber cloth.
Figure 10A:
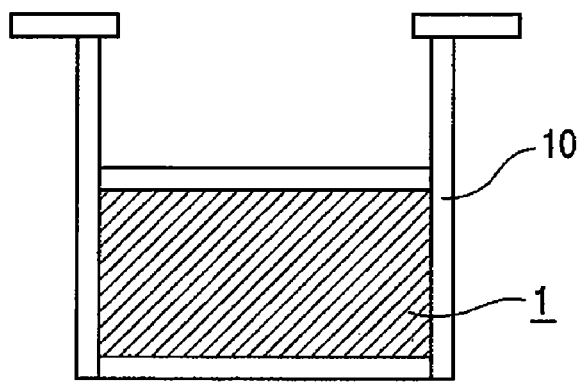
FIGS. 10A, 10B and 10C are respectively a schematic elevation, a schematic lateral view and a schematic plan view showing a state where a sintered sheet of a non-woven metal fiber cloth is fixed for electrolytic polishing.
Figure 10B:
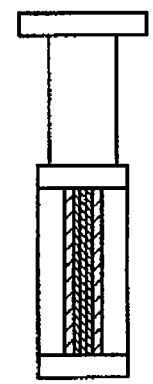
Figure 10C:
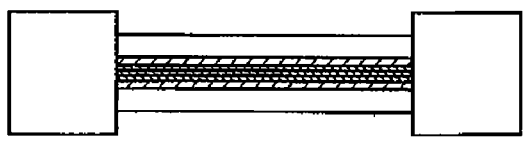
Figure 11A:
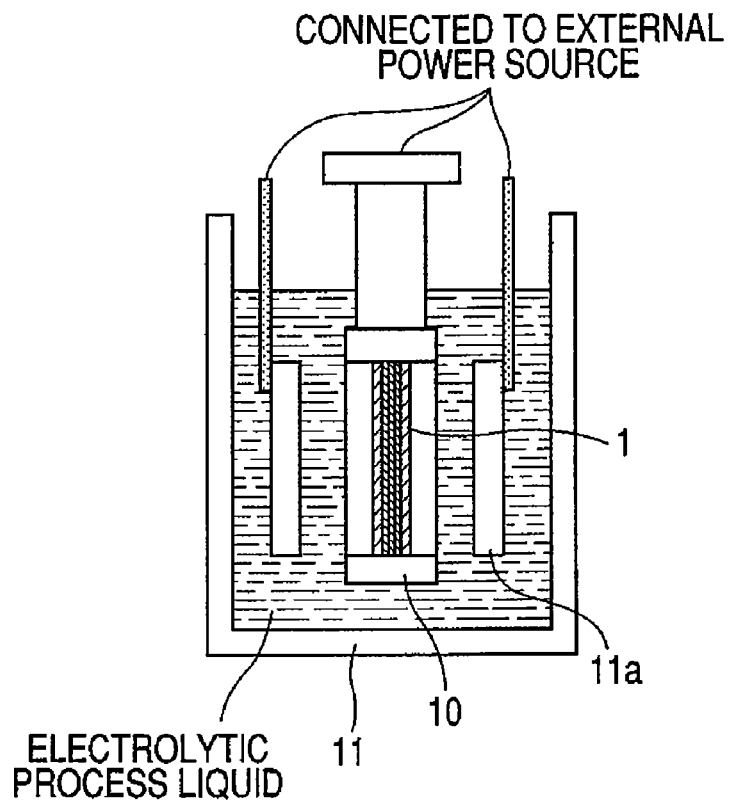
FIGS. 11A and 11B are respectively a schematic cross-sectional view seen from front and a schematic cross-sectional view seen from a lateral direction, showing a state of electrolytic polishing of a sintered sheet of a non-woven metal fiber cloth.
Figure 11B:
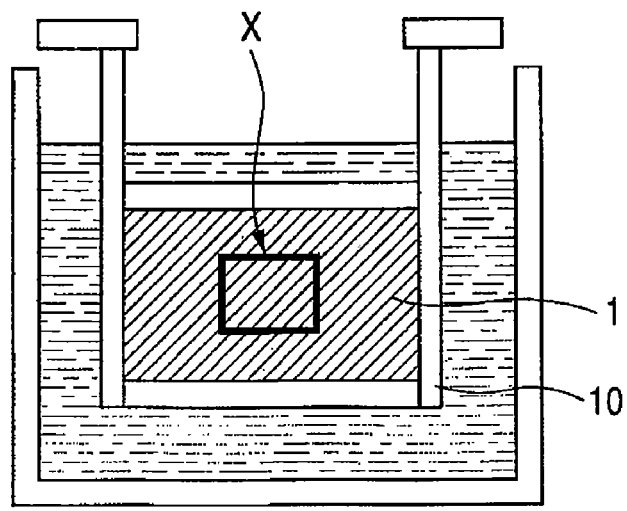

As shown in FIG. 9, three web sheets 1 formed by metal fibers of an average diameter of 4 μm were superposed, and sandwiched by web sheets 1b of metal fibers of an average diameter of 12 μm to obtain a sintered sheet 1 of non-woven metal fiber cloth. It was fixed by pinching in a frame member 10 prepared with stainless steel SUS304 as shown in FIGS. 10A-10C, and was immersed in an electrolyte liquid in an electrolytic tank 11 as shown in FIGS. 11A and 11B. Then an electrolytic polishing was conducted by passing a current between the sintered sheet 1 of non-woven metal fiber cloth itself as an anode and electrodes 11a so as to oppose to the both surfaces of the sintered sheet 1 as an anode.

Figure 12A:
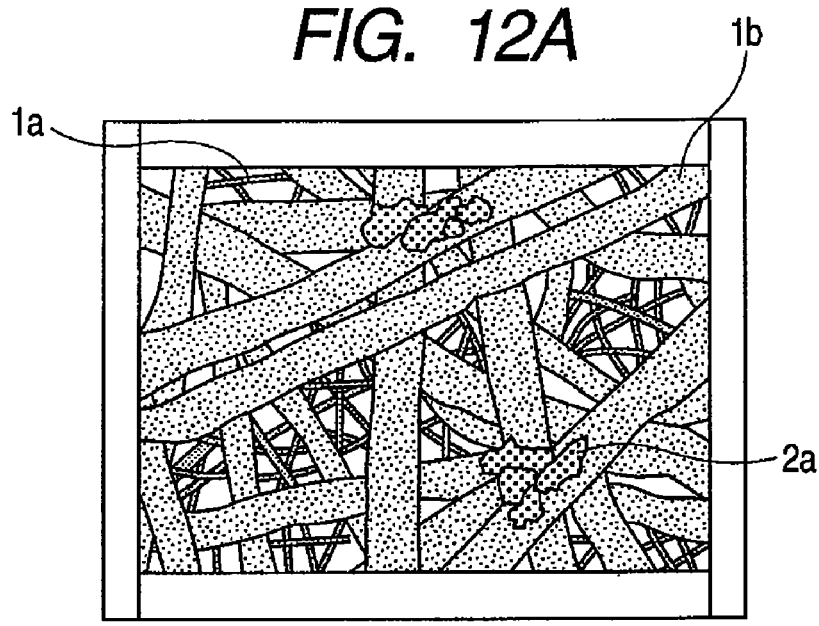
FIGS. 12A and 12B are schematic magnified views representing a SEM image of a sintered sheet of a non-woven metal fiber cloth in a portion indicated by X in FIG. 11B, and showing states respectively before and after the electrolytic polishing.
Figure 12B:
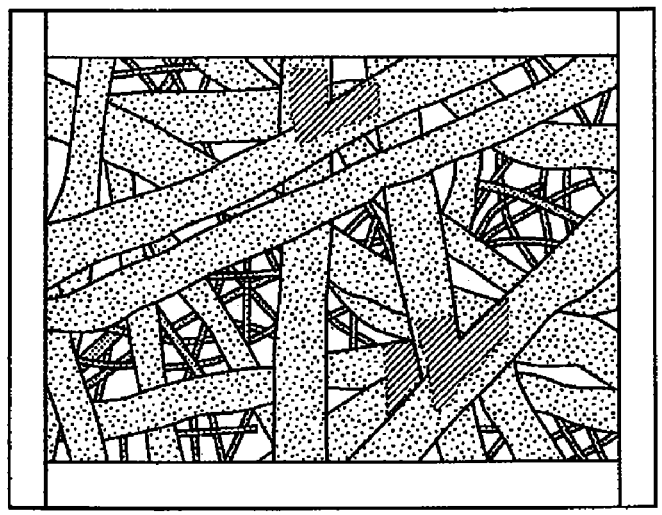
Figure 12B:
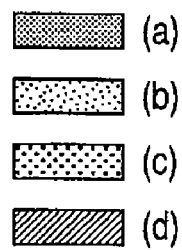

FIGS. 12A and 12B are schematic magnified views representing a SEM image of a sintered sheet of a non-woven metal fiber cloth in a portion indicated by X in FIG. 12B, and showing states respectively before and after the electrolytic polishing. This observation showed that, even after the electrolytic polishing, the metal fibers of the sheet web 11a, formed by the metal fibers of an average diameter of 4 μm and positioned inside, were not damaged.

The sintered sheet 1 of non-woven metal fiber cloth, cut into a size of 63×375 mm and subjected to the electrolytic polishing as described above, was rinsed with water, then immersed in an aqueous solution of nitric acid, again rinsed with water, then dried, formed in the shape of the filter 6 and observed under a SEM. As a result, it was observed that, as shown in FIG. 12B, the deposits 2a in the proximity of the outermost layer were removed and the properties of the filter were not deteriorated.

Conditions employed in this process are shown in the following.

Structure of Sintered Sheet of Non-Woven Metal Fiber Cloth:

A stainless steel fiber web of SUS316L having an average wire diameter of 4 μm was sandwiched between stainless steel fiber webs of an average diameter wire diameter of 12 μm, and the assembly was sintered in vacuum and subjected to a rolling to a sheet thickness of 0.3 mm.

| Formulation of electrolytic polishing liquid | |
|---|---|
| phosphoric acid (90%) | 950 ml |
| sulfuric acid (98%) | 50 ml |
| other additives | small amounts |
| Applied current density (to the sheet size) | 0.05 A/cm$^2$ |
| Current application time | 11 minutes |
| Electrolytic polishing bath temperature | 60° C. |
| Formulation of aqueous nitric acid solution | |
| nitric acid (60%) | 600 ml |
| ion exchanged water | 400 ml |
| immersion time | 2 hours |
| nitric acid aqueous solution temperature | 25° C. |

EXAMPLE 2

Filters 6, prepared in Example 1, were mounted in a recording head module 5b having 6-color flow paths as shown in FIG. 6, and the ink tanks 5a of respective colors were mounted. The module was subjected to a recording test and a durability test on an ink jet printer as shown in FIG. 8.

These tests did not show a discharge failure or a recording failure caused by a metal or a metal oxide, resulting from the filter 6.

Also in the durability test, the efficiency of use of ink was improved by 5%, and a time to destruction of a heater or a liquid discharge energy generating element in the ink jet recording head 5c was improved by 10%, thereby extending the service life of the head.

EXAMPLE 3

Conditions same as those in Example 1 were employed except for the following electrolytic polishing conditions.

The sintered sheet 1 of non-woven metal fiber cloth was formed in the shape of the filter 6 and observed under a SEM. As a result, it was observed that, as shown in FIG. 12B, the deposits 2a in the proximity of the outermost layer were removed and the properties of the filter were not deteriorated.

In FIGS. 12A and 12B, (a) indicates a metal fiber of an average wire diameter of 4 μm, (b) a metal fiber of an average wire diameter of 13 μm, (c) a deposit, and (d) a portion where the deposit is removed by electrolytic polishing.

| Formulation of electrolytic polishing liquid | |
| --- | --- |
| potassium hydroxide solution (1 N) | 1000 ml |
| potassium oxalate 1-hydrate | 30 g |
| other additives | small amounts |
| Applied current density (to the sheet size) | 0.05 A/cm$^2$ |
| Current application time | 6 minutes |
| Electrolytic polishing bath temperature | 40° C. |

EXAMPLE 4

Filters 6, prepared in Example 3, were mounted in a recording head module 5b having 6-color flow paths as shown in FIGS. 5 and 6, and the ink tanks 5a of respective colors were mounted. The module was subjected to a recording test and a durability test on an ink jet printer as shown in FIG. 8.

These tests did not show a discharge failure or a recording failure caused by a metal or a metal oxide, resulting from the filter 6.

Also in the durability test, the efficiency of use of ink was improved by 5%, and a time to destruction of a heater was improved by 10%.

EXAMPLE 5

Conditions same as those in Example 1 were employed except for an applied current density of 0.06 A/cm$^2$ and a current application time of 12 minutes.

The sintered sheet 1 of non-woven metal fiber cloth was formed in the shape of the filter 6 and observed under a SEM. As a result, the surface of the metal fibers shows a surface state as shown in FIG. 4. It was confirmed that the deposits 2a in the proximity of the outermost layer were removed.

Also the properties of the filter were not deteriorated.

EXAMPLE 6

Filters 6, prepared in Example 5, were mounted in a recording head module 5b having 6-color flow paths as shown in FIGS. 5 and 6, and the ink tanks 5a of respective colors were mounted. The module was subjected to a recording test and a durability test on an ink jet printer as shown in FIG. 8.

These tests did not show a discharge failure or a recording failure caused by a metal or a metal oxide, resulting from the filter 6.

Also in the durability test, the efficiency of use of ink was improved by 5%, and a time to destruction of a heater was improved by 10%.

In the foregoing, the present invention has been explained by specific examples, but the present invention is not limited, by such examples, in the average wire diameter in the sintered sheet of the non-woven metal fiber cloth, the formation of the electrolytic polishing bath and the like, but also includes following embodiments:

a filter to be placed in a liquid passage and formed by a sintered non-woven metal fiber cloth in which a substance sticking to a surface of metal fibers present in an outermost part and in a proximity thereof is removed together with a surface layer of the metal fibers;

a step of removing the deposit together with the surface layer of the metal fibers is executed by an electrolytic polishing under a contact of the filter with an aqueous electrolyte solution, utilizing the filter as an anode;

the metal fibers are formed by austenite type stainless steel;

the filter of the sintered non-woven metal fiber cloth is formed by superposing wet-shaped metal fiber sheets, then sintering the sheets in a vacuum heating open to cause an atomic diffusion bonding of the metals in a contact point of fibers, then pressing it under a pressure and executing an electrolytic polishing;

the filter of the sintered non-woven metal fiber cloth is formed by sandwiching a web-shaped metal fiber sheet of a smaller wire diameter in a central part with web-shaped metal fiber sheets of a larger wire diameter, then sintering and pressing the sheets and executing an electrolytic polishing;

the filter of the sintered non-woven metal fiber cloth in which a crystal grain boundary and a defect, present in the vicinity of the metal fiber surface at a side opposed to a chemical liquid, are removed by an electrolytic polishing together with a deposit on the surface; and the filter of the sintered non-woven metal fiber cloth is formed by immersing a sintered member of non-woven-metal fiber cloth subjected to an electrolytic polishing in immersing an aqueous nitric acid solution thereby forming an oxide film on the surface.

The removal of the surface deposit, caused in the process for preparing the sintered member of the non-woven metal fiber cloth, together with the surface layer of the metal fibers allows to remove the deposit thermally fused or mechanically pressed into the metal fibers, together with the irregularities generated at the vacuum sintering at the pressing operation thereafter.

Such removing process, executed by an electrolytic polishing under the contact of the filter 6 with an aqueous electrolyte solution, utilizing the filter 6 as an anode, allows remove the deposit and the irregularities, while minimizing a damage to the jointing portion of metal fibers not directly opposed to the cathode. Therefore the tensile strength of the filter is not deteriorated even after the removal of the deposit.

The aqueous electrolyte solution to be employed in such electrolytic-polishing may be an acidic one or an alkaline one, which can be suitably selected, and the formulation of the aqueous electrolyte solution is preferably so regulated as to suppress an etching rate in a portion of the processed article having a low current density. It is thus possible reduce the possibility of damage to a portion not requiring electrolytic polishing, such as a pointing portion of the metal fibers or a central part of the filter where deposits are absent.

The aqueous electrolyte solution includes an acidic aqueous solution containing phosphoric acid as a principal component and added with a small amount of sulfuric acid and other components, and an alkaline aqueous solution containing potassium hydroxide as a principal component and added with a small amount of an organic acid and other components. These solution may be employed advantageously depending on the situation.

Also a material to be employed as a counter electrode for the processed article in such electrolysis can be any material having electro-conductivity and insoluble in the electrolytic polishing bath. There may be employed, for example, a stainless steel plate, or a stainless steel plate surfacely coated with platinum, which may be suitably selected according to the situation. For example a copper plate should be avoided, as it, though having an excellent electro-conductivity, is easily soluble in the electrolytic bath, is deposited on the processed article and may be dissolved out after incorporation in an apparatus as a filter.

The filter 6 of the present invention is constituted of a sintered filter of a non-woven metal fiber cloth of a higher filtering ability, formed by sandwiching a web-shaped metal fiber sheet of a smaller wire diameter in a central part with web-shaped metal fiber sheets of a larger wire diameter, then sintering and pressing the sheets. In case of utilizing a chemical polishing process, not utilizing the electrical energy as in the present examples, on the filter 6, it is difficult to obtain a contrast in the etching rate between the thicker metal-fibers on the outside and the thinner metal fibers in the center. Because of such difficulty, there results a danger that the thinner metal fibers in the center may break by an over-etching, thereby deteriorating the function of the filter. However, in case an electrolytic polishing is utilized for removing the deposit on such filter, an electric power supplied for executing such electrolytic polishing is preferentially consumed in the thicker metal fibers on the outside. Therefore the polishing rate to the finer metal fibers at the inside becomes negligibly small, thereby reducing the possibility of breakage of the finer metal fibers by an over-etching.

Also in case a crystal grain boundary or a defect is formed in the vicinity of the fiber surface in the process of preparing the web-shaped stainless steel fibers before the electrolytic process or in the process of preparing the sintered non-woven stainless steel cloth, a following finding was made. Depending on the type of the aqueous electrolyte solution to be employed in the electrolytic polishing or the conditions thereof, such crystal grain boundary or defect may be preferentially etched in the course of the electrolytic polishing, thereby forming fine grooves on the metal fiber surface in the outermost layer of the sheet. However, as such grooves formed by electrolytic polishing are very shallow, the electrolytic polishing liquid did not remain in the grooves in any extent to pose a problem, by a sufficient rinsing subsequent to the electrolytic polishing. Also this does not cause a break in the metal fibers so that the function of the filter is not deteriorated. However, such electrolytic polishing generates a spontaneous oxide film on the polished surface of the stainless steel fibers. The formation of such oxide film is not even, and when the filter is mounted on the apparatus and is continuously contacted with a chemical liquid, there may result a partial erosion of the surface of the stainless steel fibers or a dissolution of the stainless steel components into the chemical liquid. In order to avoid such phenomena, it is necessary, after the rinsing step subsequent to the electrolytic polishing, to immerse the sintered non-woven stainless steel cloth in an aqueous nitric acid solution, thereby forming, on the surface of the stainless steel fibers, an oxide film which is continuous and has a certain thickness. For this purpose, it is preferable to immerse the sintered non-woven stainless steel cloth in an aqueous-nitric acid solution of 30-40%, for 30 minutes or longer at the room temperature.

The present invention further includes following embodiments:
- a filter formed by a sintered non-woven metal fiber cloth is installed in a passage for supplying a liquid (chemical liquid or ink) to a member which discharges the liquid thereby forming an image;
- a liquid discharge head, utilizing a filter of a sintered non-woven metal fiber cloth, executes an image recording by discharging the liquid (chemical liquid or ink) onto a recording medium by heating or mechanically pressing out the liquid, and an ink jet printer mounted with such a liquid discharge head; and
- a filter formed by a sintered non-woven metal fiber cloth is installed in a jointing part of a detachable ink tank and a recording head module.

As explained in the foregoing, a filter provided of a structure of the present invention, provided in a liquid supply path for a chemical liquid in an apparatus for forming an image by discharging the liquid (chemical liquid or ink), allows to reduce an imaging failure resulting from fine dusts, thereby improving the yield of completed images.

Particularly in case the aforementioned apparatus is an ink jet printer for forming an image by flying a chemical liquid to a recording medium by a bubble generating energy when the chemical liquid is heated, attention has to be paid to the following points. With the recent improvement in the image recording precision, the ink discharge nozzle with a nozzle diameter of about 15 μm is widely employed, and the nozzle diameter shows a trend of further decrease. Therefore, the filter to be installed in the liquid supply passage is required to have an ability of removing a foreign substance of 10 μm or even less. However it is considerably difficult to remove fine foreign substances detrimentally affecting the above-mentioned fine nozzles with a mesh filter prepared with metal or resinous fibers or by patterning or etching a metal plate, because a filtration of a foreign substance of about 10 μm or smaller with a mesh type filter results in a large resistance for liquid passing, and also because such filter is difficult to produce thereby elevating the cost. It is therefore necessary in the system mentioned above, to adopt a filter of a sintered non-woven metal fiber cloth formed by combining metal fiber webs of different wire diameters thereby improving the eliminating ability for the fine foreign substance. In such case, a foreign substance, derived from the producing process of the filter and eventually peeled from the sintered filter itself of the non-woven metal fiber cloth, may clog the fine discharge nozzle or may hinder the smooth liquid discharge, thereby involving a danger of significantly deteriorating the recording precision, of the ink jet printer.

In such case, the filter of the invention mounted in the ink flow path allows to prevent the foreign substance generated from the filter from entering into the ink discharge head, thereby enabling to prevent the deterioration of the recording precision.

Also within the liquid passage of the ink jet printer having the filter of the present invention, such filter is most preferably mounted in the jointing portion between the detachable ink tank and the recording head module. The filter installed in such portion allows not only to remove the foreign substance derived from the ink tank but also the bubble involvement into the ink passage resulting at the detach/attaching operation of the ink tank; thereby reducing the ink discharge failure caused by the bubble riding on the ink heating heater.

This results from an improved adhesion between the pressure contact member mounted on an end face of the ink tank and the filter of the sintered non-woven metal fiber cloth having a smoother surface by the electrolytic polishing process. Also for a similar reason, a gas-liquid exchange at the detach/attaching operation of the ink tanks can be achieved smoothly to achieve an improved efficiency in the use of ink.

Also in detaching the ink tank 5a from the recording head module 5b, a frictional property between the pressure contact member 7a of the ink tank 5a and the surface of the filter 6 is improved, whereby the ink tank 5 could be detached and attached more easily.

COMPARATIVE EXAMPLE 1

When the sheet 1 of the sintered non-woven metal fiber cloth employed in Example 1 was subjected to an ultrasonic washing in ion exchanged water, then dried, formed into the shape of the filter 6 and subjected to a SEM observation, the deposits in the vicinity of the outermost layer were not removed as shown in FIG. 2.

Also the metal fibers were disentangled by the ultrasonic vibration, thereby deteriorating the filter characteristics.

COMPARATIVE EXAMPLE 2

Filters, prepared in Comparative Example 1, were mounted in a recording head module 5b having 6-color flow paths as shown in FIGS. 5 and 6, and the ink tanks 5a of respective colors were mounted. The module was subjected to a recording test and a durability test on an ink jet printer as shown in FIG. 8.

These tests showed a discharge failure or a recording failure caused by a metal or a metal oxide, resulting from the filter 6, in a rate 5%.

Also the durability test did not show a noticeable difference in the service life from an untreated product.

As explained in the foregoing, the removal of the fine deposits on the metal fiber surface in the outermost layer and in the vicinity thereof in the sintered sheet of the non-woven metal fiber cloth together with the surface layer of the metal fibers, allowed to remove the defect and the crystal grain boundary generated in the preparation of the sintered sheet of the non-woven metal fiber cloth, in a same removing step.

Also the filter subjected to such process, when applied to a liquid discharge head, significantly reduced the possibility of deposition of fine foreign substance in the liquid passage or around the discharge port, thereby suppressing the defects in quality caused by the deflected liquid discharge or by the liquid discharge failure.

This application claims priority from Japanese Patent Application No. 2005-012758 filed on. Jan. 20, 2005, which is hereby incorporated by reference herein.

What is claimed is:

1. A method for producing a filter comprising a sintered sheet of a non-woven cloth of a metal fiber to be installed in a liquid passage, the method comprising steps of:
    preparing the sintered sheet with a web-shaped laminated structure, the sintered sheet comprising a first non-woven layer constituted of a first metal fiber with a predetermined average wire diameter inside the sintered sheet and second non-woven layers constituted of a second metal fiber with an average wire diameter greater than the predetermined average wire diameter and forming both surfaces of the sintered sheet, wherein the first non-woven layer and the second non-woven layer are directly bonded with each other;
    rolling the sintered sheet after preparing the sintered sheet; and
    electrolytic polishing the sintered sheet after said rolling step, with the sintered sheet serving as an anode, by arranging two electrodes serving as a cathode at positions opposed to the second non-woven layers so that an etching rate of the first metal fiber is less than that of the second metal fiber.

2. A method for producing a filter according to claim 1, wherein the sintered sheet includes a deposit deposited on surfaces of the second non-woven layers before the electrolytic polishing.

3. A method for producing a filter according to claim 2, wherein the deposit is a metal or a metal-oxide, and wherein a metal type of the deposit is different from a metal type of the second metal fiber.

4. A method for producing a filter according to claim 1, wherein the first metal fiber and the second metal fiber are constituted of an austenite type stainless steel.

5. A method for producing a filter according to claim 1, further comprising a step of:
    forming an oxide film on both surfaces of the sintered sheet by immersing the sintered sheet in an aqueous nitric acid solution after said electrolytic polishing step.

6. A method for producing a filter according to claim 1, wherein the two electrodes comprise stainless steel plates.

7. A method for producing a filter according to claim 6, wherein each of the stainless steel plates is surface coated with platinum.

8. A method for producing a filter according to claim 1, wherein the first non-woven layer is formed by laminating a non-woven cloth constituted of a plurality of the first metal fibers and sintering the laminated non-woven cloth.

9. A method for producing a filter according to claim 1, wherein an etching rate of the first metal fiber becomes less than that of the second metal fiber by regulating a formulation of an electrolytic polishing liquid in said electrolytic polishing step.

10. A method for producing a filter according to claim 1, wherein an electrolytic polishing liquid used in said electrolytic polishing step comprises a mixture of a phosphoric acid and a sulfuric acid.

11. A method for producing a filter according to claim 10, wherein the mixture includes a phosphoric acid with a concentration of 90% and a sulfuric acid with a concentration of 98%, and a mixing ratio of the phosphoric acid with a concentration of 90% and the sulfuric acid with a concentration of 98% is 95:5.

12. A method for producing a filter according to claim 1, wherein an electrolytic polishing liquid used in said electrolytic polishing step comprises a mixture of a potassium hydroxide and a potassium oxalate.

13. A method for producing a filter according to claim 12, wherein the mixture includes a 1N potassium hydroxide solution and a potassium oxalate 1-hydrate, and a mixing ratio of the potassium oxalate 1-hydrate and the 1N potassium hydroxide solution is 30 g:1000 ml.

* * * * *